United States Patent Office 3,074,958
Patented Jan. 22, 1963

3,074,958
PROCESS FOR PREPARING METAL PHTHALOCYANINES
Maurice H. Fleysher, Buffalo, and Walter B. Richards, Hamburg, N.Y., assignors to Allied Chemical Corporation, New York, N.Y., a corporation of New York
No Drawing. Filed Dec. 2, 1960, Ser. No. 73,191
5 Claims. (Cl. 260—314.5)

This invention relates to improvements in the manufacture of metal phthalocyanines.

Metal phthalocyanines are valuable organic pigments and are noted for their clarity of shade and fastness to light. In the main, two types of processes are used commercially for the manufacture of these pigments, the nitrile process and the urea process (so-called Wyler or Wyler-Riley Process which will hereinafter be referred to as the urea process). The latter process finds extensive application in view of the economy and availability of phthalic anhydride, compared to phthalonitrile, as the phthalocyanine intermediate employed in the process. The urea process, however, as heretofore practiced, gave poor yields, particularly in the case of cobalt, ferrous iron and magnesium phthalocyanines and reaction products of poor quality requiring extensive purification to meet commercial specifications. For example, U.S. Patent 2,647,128 granted July 28, 1953, in column 1, refers to yields of the order of 10% to 15% of theory based on the amount of phthalic anhydride employed, in the case of aluminum phthalocyanine and also poor yields in the case of magnesium and nickel phthalocyanines.

It is a principal object of the present invention to improve the urea process to markedly increase the yield and/or quality of the metal phthalocyanines.

Other objects and advtanges of this invention will be apparent from the following description thereof:

The urea process is generally carried out by heating together (1) a phthalocyanine intermediate, such as phthalic anhydride, phthalic acid, phthalic acid esters, phthalic acid salts, e.g., ammonium salt or salt of the particular metal to be fixed in the phthalocyanine molecule, phthalodiamide, phthalimide or mixtures of two or more of the above mentioned illustrative equivalents of phthalic anhydride; (2) a metal donor such as the inorganic salts, e.g., the chlorides, bromides, nitrates, phosphates, borates, and sulfates of the metal, the organic salts such as the oxalates, succinates, phthalates of the metal, the oxides of the metal, the free metal or mixtures of these metal yielding substances; (3) urea or a derivative thereof such as biuret, guanidine, guanidyl-urea, dicyandiamide, cyanuric acid or mixtures of these nitrogen donors; (4) an inert high boiling organic solvent such as nitrobenzene, trichlorobenzene, o-dichlorobenzene, kerosene, naphthalene or mixtures of such solvents in the presence of (5) a catalyst which promotes the formation of the metal phthalocyanine such as ammonium molybdate or other compound containing a metal of group V or VI of the periodic system having an atomic number of from 15 to 92, inclusive, as well as mixtures of such compounds including, for example, ammonium borotungstate, ammonium phosphomolybdate and phosphotungstomolybdic acid.

In accordance with the present invention, metal phthalocyanines are prepared by the urea process in relatively high yields and in excellent quality by including in the reaction mass, which contains a phthalocyanine intermediate consisting of benzene containing in the nucleus four hydrogen atoms and two ortho substituents capable of forming a tetrazaporphine ring, a nitrogen donor and a metal donor, from about 0.4 to 1.5 mols or more of ammonium chloride per mol of phthalic anhydride, or its equivalent when utilizing a phthalocyanine intermediate other than phthalic anhydride.

Surprisingly, the inclusion of ammonium chloride in the reaction mass employed in the urea process results in a marked improvement in yield and/or quality, usually both, of the metal phthalocyanines and this improvement is especially marked in the case of the production of cobalt, ferrous, and magnesium phthalocyanines. The improvement in yield and/or quality of the metal phthalocyanines by the inclusion of ammonium chloride in the reaction mass used in the urea process is peculiar and special to the production of unsubstituted metal phthalocyanines. In the case of the substituted metal phthalocyanines, e.g., sulfonated or halogenated metal phthalocyanines, the presence or absence of the ammonium chloride in the reaction mass employed in the urea process has little or no appreciable effect on the yield or quality of the substituted metal phthalocyanines. Unexpectedly, however, the inclusion of ammonium chloride in the amounts above disclosed in the reaction mass employed to produce unsubstituted metal phthalocyanines by the ureau process, gives a marked improvement in yield and/or quality of the metal phthalocyanines. The reference herein to metal phthalocyanines means unsubstituted metal phthalocyanines unless otherwise indicated.

Preferably, at least 0.4 mol of ammonium chloride is used per mol of phthalic anhydride or its equivalent. Larger amounts than 1.5 mols of ammonium chloride per mol of phthalic anhydride or its equivalent can be used but little or no noticeable further improvement is obtained by the use of such larger amounts and hence such larger amounts are wasteful and not recommended for this reason and because they add to the bulk of the reaction mixture. Preferably, an equimolar amount of ammonium chloride is used relative to the amount of phthalic anhydride or its equivalent present in the reaction mass.

The amount of the reactants in the reaction mass generally can be varied over a wide range. For example, based upon the amount of phthalic anhydride or its equivalent present in the reaction mass:

(a) The amount of urea or other nitrogen donor used can be from 1 to 4 times by weight.

(b) The amount of metal donor substance can be from at least 110% atomic equivalent amount to about 200% of the equivalent amount.

(c) The amount of solvent is generally at lesat that amount which provides a stirrable reaction mass. Larger amounts can and usually are used but obviously excessive amounts are wasteful of solvent, increase the heating requirements of the process and are difficult and expensive to remove and recover.

(d) The amount of catalsyt is the usual relatively small catalytic amount, of the order of from 0.1% to 5% of the reaction mass.

The urea process is conventionally carried out at elevated temperatures, i.e., from about 150° C. to about 250° C. Generally, the optimum reaction temperature will depend upon the specific metal phthalocyanine being produced, although in most instances we prefer to operate within the range of about 150° C. to 215° C.

The improvement in yield obtained by this invention is most striking in the preparation of cobalt, iron and magnesium phthalocyanines. Known methods for synthesis of these substances are characterized by extremely low yields and generally poor quality of products. By the present invention, yields of cobalt phthalocyanine of excellent quality of 90% and better, have been obtained; the improvement in yield and quality of iron and magnesium phthalocyanines are also striking.

In the case of copper phthalocyanine, the present invention gives consistently about 5% higher yields (90+% vs. about 85%) than the urea process carried out under the same conditions but without the ammonium chloride in the reaction mixture but, what is equally, if not more important, gives a product of significantly better quality. In the preparation of other metal phthalocyanines, such as the aluminum, nickel, zinc and vanadium, the yield of the product produced by the urea process when ammonium chloride is present in the reaction mass, as herein disclosed, is significantly higher and the quality markedly better than when ammonium chloride is not used.

In accordance with a preferred mode of carrying out the invention in the production of cobalt phthalocyanine, a mixture of 1 part by weight of phthalic anhydride, 0.28 part of anhydrous cobaltous chloride, .345 part of ammonium chloride, 0.028 part of ammonium molybdate and 2.1 parts of urea are added to 4 parts by volume of trichlorobenzene and the mixture is heated to about 130° C. The mass foams and is held at 130° to 135° C. until the foaming subsides. Thereafter the mass is gradually heated to and maintained at about 180° to 190° C. for about 8 hours. The resultant mixture is cooled to 100° C. and diluted with sufficient solvent to obtain a readily pourable mass. Then it is filtered and washed with benzene. The filter cake is freed of solvent by steam distillation and the solvent free residue is made strongly acid. The slurry is filtered, washed acid free, reslurried in dilute aqueous caustic soda at 80° C., filtered, washed and dried. Yields of 90% and better of excellent quality cobalt phthalocyanine are produced.

The following examples illustrate the improved process of our invention but it is to be understood that many variations in the details set out in these purely illustrative examples can be made without departing from the scope or spirit of the invention. Parts and percentages in this specification, including the examples, unless otherwise indicated, are by weight, and temperatures are given in degrees centigrade.

EXAMPLE I

To about 350 parts of agitated trichlorobenzene, 64 parts of phthalic anhydride, 133 parts of urea, 18 parts of anhydrous cobaltous chloride, 22 parts of ammonium chloride and 1.8 parts of ammonium molybdate were added. The mixture was heated rapidly to 100° and then to 130° as rapidly as the foaming mass would permit. It was held at 130° to 135° for about 1 to 2 hours to permit the foaming to subside and thereafter the temperature was gradually raised to 180°. The mass was heated at 180° to 190° for 8 hours and then it was cooled to 100°. After the addition of about 45 to 50 parts of trichlorobenzene, the slurry was filtered. The filter cake was washed with benzene until the washings ran clear.

The washed cake was steam distilled until the solvent was removed. The aqueous residue was made acid to Congo Red by the addition of hydrochloric acid. The slurry was filtered and washed acid free with water. The washed cake was reslurried in about 1000 parts of 5% aqueous caustic soda at 80° and then filtered hot, washed alkali free with water. The washed cake was reslurried in about 1000 parts of 5% aqueous caustic soda at 80° and then filtered hot, washed alkali free with water and dried. The dried cobalt phthalocyanine thus obtained weighed 55.5 parts and was equivalent to a yield of 90% of the theoretical amount based on phthalic anhydride. The quality of the product was excellent.

Repetition of the above experiment but omitting the ammonium chloride gave 52.5 parts of cobalt phthalocyanine of inferior quality.

Repetition of the above example but using a reaction temperature of 195° to 200° instead of 180° to 190° resulted in a slightly higher yield (2-3%) of a cobalt phthalocyanine of excellent quality.

EXAMPLE II

The procedure of Example I was repeated up to the point where the eight-hour heating period was completed. Thereafter the mass was cooled to 125° and 50 parts of urea and 30 parts of trichlorobenzene were added. The mass was slowly (2 to 3 hours) reheated to 180° and maintained at 180° to 190° for an additional eight hours. The product was worked up in essentially the same manner as in Example I. The yield of cobalt phthalocyanine obtained in this manner amounted to 59.5 parts, equivalent to a yield of 96% of the theoretical amount based on the phthalic anhydride. The quality was excellent.

Repetition of this experiment but omitting ammonium chloride from the reaction mass gave 54 parts of a brownish product of markedly inferior quality.

EXAMPLE III

A series of cobalt phthalocyanine runs were carried out according to the directions given in Example I above, in which the quantity of ammonium chloride was varied and for comparison purposes a run was carried out in which no ammonium chloride was included in the reaction mixture. The details of these runs are given in the following Table I:

| Amount of NH$_4$Cl | | Yield, parts | Spectral strength, percent | Yield percent on comparable strength basis |
| --- | --- | --- | --- | --- |
| Parts | Mols | | | |
| 0 | 0 | 52.5 | 83 | 70 |
| 11 | 0.477 | 54.0 | ¹ 95 | 83 |
| 22 | 0.954 | 55.5 | 99 | 89 |
| 33 | 1.431 | 53.5 | ¹ 98 | 85 |

¹ Used 33 parts of cobaltous chloride hexahydrate instead of 18 parts of anhydrous CoCl$_2$.

EXAMPLE IV

To about 350 parts of agitated trichlorobenzene, 64 parts of phthalic anhydride, 18 parts of anhydrous ferrous chloride, 133 parts of urea, 22 parts of ammonium chloride and 1.8 parts of ammonium molybdate were added. The mass was slowly heated to 130° and held at 130° to 135° for 1 hour to permit the foaming to subside. The mass was heated to 180° in about 3 hours and held at 180° to 190° for about 8 hours. After the mass had been cooled to 100°, about 45 parts of trichlorobenzene were added and the resultant slurry was filtered. The filter cake was washed with benzene and then steam distilled until free of solvent. The aqueous residue was strongly acidified with hydrochloric acid and filtered and washed acid free. The cake was digested with 1500 parts of 5% aqueous caustic soda, filtered, washed and dried. The dried iron phthalocyanine weighed 58 parts, which is equivalent to a yield of 95% of theory based on the phthalic anhydride.

EXAMPLE V

To about 650 parts of agitated trichlorobenzene, 105 parts of phthalic anhydride, 9.1 parts of magnesium oxide, 18.5 parts of ammonium chloride, 220 parts of urea and 3 parts of ammonium molybdate were added. The mixture was slowly heated to 130° to 135° and maintained thereat for about 1 hour. The temperature was then raised to 180° and maintained at 180° to 190° for 8 hours. After cooling to 120° and diluted with about 90–100 parts of trichlorobenzene, the product slurry was filtered. The filter cake was washed with benzene and then with alcohol until the washings ran clear. The washed cake was digested at 85° to 90° for one hour in 1000 parts of water containing 30 parts of ammonium chloride. The slurry was filtered and washed with hot water until the washings were chloride and magnesium ion free. The washed cake was reslurried in 1000 parts of hot water and 50 parts of 50% aqueous caustic soda were added. The alkaline slurry was heated to and maintained at 85° to 90° for 1 hour and then filtered, washed and dried. The magnesium phthalocyanine obtained in this fashion weighed 25 parts; this is equivalent to a yield of 26.4% of theory based on the phthalic anhydride.

Repetition of this experiment but extending the period of heating at 180° to 190° to 16 hours resulted in a yield of 30.6% of theory based on the phthalic anhydride.

Likewise, repetition of this experiment but heating the reaction mixture at 210° to 215° for 16 hours resulted in a yield of 64% of theory based on the phthalic anhydride and of excellent quality material.

Magnesium phthalocyanine prepared according to Example 5 of U.S. Patent 2,647,128, in which sodium tripolyphosphate was used as an auxiliary catalyst, and no ammonium chloride was added to the reaction mixture, gave only a 20.8% yield based on the phthalic anhydride.

EXAMPLE VI

A mixture of 64 parts of phthalic anhydride, 133 parts of urea, 18 parts of anhydrous cupric chloride, 1.8 parts of ammonium molybdate and 22 parts of ammonium chloride was added to about 380 parts of trichlorobenzene and the mass was heated to 130°. It was held at 130° to 135° until the foaming practically ceased, then gradually heated to and maintained at 180° to 190° for 8 hours. The mass was diluted with about 50 parts of trichlorobenzene, cooled to 100° and filtered. The filter cake was washed with about 50 parts of hot trichlorobenzene and then with benzene until the washings ran clear. The filter cake was then steam distilled to remove adherent solvent and the residue was made strongly acid by the addition of hydrochloric acid. The acid slurry was agitated at 80° for 1 hour and then filtered. The filter cake was washed acid free and then reslurried in about 2500 parts of 5% aqueous caustic soda. The alkaline slurry was digested at 80° to 90° for 1 hour and then filtered, washed alkali free and dried.

Copper phthalocyanine of excellent quality was obtained in the amount of 57 parts which is equivalent to a yield of 91.8% of theory based on the phthalic anhydride.

Repetition of the above experiment but omitting ammonium chloride from the reaction mixture gave a product of poorer quality of 84.5% yield based on the phthalic anhydride.

It will be noted that the present invention improves the urea process for the production of unsubstituted metal phthalocyanines and provides an efficient and readily operated process for preparing unsubstituted metal phthalocyanines in improved yield and/or quality.

It is to be understood that this invention is not restricted to the present disclosure otherwise than as defined by the appended claims.

What is claimed is:

1. In a process for preparing a metal phthalocyanine by heating a reaction mixture containing (1) a phthalocyanine intermediate from the group consisting of phthalic anhydride, phthalic acid, phthalic acid esters, phthalic acid salts, phthalodiamide, phthalimide and mixtures thereof: (2) a nitrogen donor from the group consisting of urea, biuret, guanidine, guanidyl-urea, dicyandiamide, and cyanuric acid; and (3) a metal donor, the improvement which comprises incorporating ammonium chloride in the reaction mixture in amount at least sufficient to improve the yield of the metal phthalocyanine from the reaction mixture as compared with the yield obtained from the reaction mixture without the ammonium chloride.

2. In a process for preparing a metal phthalocyanine by heating a reaction mixture containing (1) a phthalocyanine intermediate from the group consisting of phthalic anhydride, phthalic acid, phthalic acid esters, phthalic acid salts, phthalodiamide, phthalimide and mixtures thereof; (2) a nitrogen donor from the group consisting of urea, biuret, guanidine, guanidyl-urea, dicyandiamide, and cyanuric acid; (3) a metal donor; (4) a solvent from the group consisting of nitrobenzene, trichlorobenzene, o-dichlorobenzene, kerosene, naphthalene, and mixtures thereof; and (5) a compound containing a metal of groups V and VI of the periodic system having an atomic number of from 15 to 92, inclusive, the improvement which comprises incorporating in the reaction mixture from about 0.4 to about 1.5 mols of ammonium chloride per mol of phthalic anhydride equivalent in the reaction mixture.

3. In a process for preparing a metal phthalocyanine by heating a reaction mixture to a temperature of from 150° to 250° C. containing phthalic anhydride, urea, a metal donor, a solvent from the group consisting of nitrobenzene, trichlorobenzene, o-dichlorobenzene, kerosene, naphthalene, and mixtures thereof, and a compound containing a metal of groups V and VI of the periodic system having an atomic number of from 15 to 92, inclusive, the improvement which comprises incorporating in the reaction mixture from about 0.4 to 1.5 mols of ammonium chloride per mol of phthalic anhydride.

4. In a process for preparing a metal phthalocyanine by heating to a temperature of from 150° to 250° C. a reaction mixture containing phthalic anhydride, urea, a metal donor, trichlorobenzene, and ammonium molybdate, the improvement which comprises incorporating in the reaction mixture from about 0.4 to about 1.5 mols of ammonium chloride per mol of phthalic anhydride.

5. In a process for preparing a metal phthalocyanine by heating to a temperature of from 150° to 215° C., a reaction mixture containing phthalic anhydride, from 1 to 4 parts by weight of urea per part of phthalic anhydride, a metal donor in amount of from 110% to 200% by weight of the amount of metal required for reaction with the phthalic anhydride to form the metal phthalocyanine, said metal donor being from the group consisting of cobaltous, ferrous, magnesium and cupric compounds, an amount of trichlorobenzene at least sufficient to provide a stirrable reaction mass, and from 0.1 to 5% of the weight of the reaction mass of ammonium molybdate, the improvement which comprises incorporating in the reaction mixture from about 0.4 to 1.5 mols of ammonium chloride per mol of phthalic anhydride.

References Cited in the file of this patent

UNITED STATES PATENTS

| 2,155,038 | Davies et al. | Apr. 18, 1939 |
| 2,216,868 | Wyler | Oct. 8, 1940 |
| 2,686,184 | Wettstein | Aug. 10, 1954 |

OTHER REFERENCES

Venkataraman: Synthetic Dyes, Acad. Press, New York (1952), vol. II, pages 1126–1132.

Lubs: Chemistry of Synthetic Dyes and Pigments, Reinhold, New York (1955), pages 584–587.